US008064387B2

(12) United States Patent
Jiang et al.

(10) Patent No.: US 8,064,387 B2
(45) Date of Patent: Nov. 22, 2011

(54) WIRELESS-LINKED REMOTE ECOLOGICAL ENVIRONMENT MONITORING SYSTEM

(75) Inventors: Joe-Air Jiang, Taipei (TW); En-Cheng Yang, Taipei (TW); Chwan-Lu Tseng, Taipei (TW); Chia-Pang Chen, Taipei (TW); Tzu-Shiang Lin, Taipei (TW); Yung-Cheng Wu, Taipei (TW); Chen-Ying Lin, Taipei (TW); Chu-Ping Tseng, Taipei (TW); Shih-Hsiang Lin, Taipei (TW); Chih-Sheng Liao, Taipei (TW); Shih-Hao Szu, Taipei (TW); Chung-Wei Yen, Taipei (TW); Kuang-Chang Lin, Taipei (TW); Zong-Siou Wu, Taipei (TW); Fu-Ming Lu, Taipei (TW)

(73) Assignee: National Taiwan University, Taipei (TW)

( * ) Notice: Subject to any disclaimer, the term of this patent is extended or adjusted under 35 U.S.C. 154(b) by 677 days.

(21) Appl. No.: 12/229,181

(22) Filed: Aug. 19, 2008

(65) Prior Publication Data

US 2009/0252087 A1     Oct. 8, 2009

(30) Foreign Application Priority Data

Apr. 3, 2008  (TW) .............................. 97112117 A

(51) Int. Cl.
*H04W 4/00* (2009.01)

(52) U.S. Cl. ...................... 370/328; 370/310.2; 370/338; 455/41.2; 455/41.3; 455/90.1; 455/418; 455/419; 455/420; 455/422.1; 455/550.1; 455/552.1; 455/553.1

(58) Field of Classification Search ............... 370/310.2, 370/328, 338; 455/418–420, 423–425, 422.1, 455/41.2, 41.3, 552.1, 553.1, 550.1, 90.1
See application file for complete search history.

(56) References Cited

U.S. PATENT DOCUMENTS

| 7,119,676 | B1 * | 10/2006 | Silverstrim et al. | 340/531 |
|---|---|---|---|---|
| 7,133,800 | B2 * | 11/2006 | Delin et al. | 702/125 |
| 7,183,899 | B2 * | 2/2007 | Behnke | 340/286.01 |
| 2005/0074025 | A1 * | 4/2005 | Shao et al. | 370/461 |
| 2006/0248197 | A1 * | 11/2006 | Evans et al. | 709/227 |

* cited by examiner

*Primary Examiner* — Steve D Agosta
(74) *Attorney, Agent, or Firm* — Peter F. Corless; Steven M. Jensen; Edwards Wildman Palmer LLP

(57) ABSTRACT

A wireless-linked remote ecological environment monitoring system is proposed, which is characterized by the use of a sensor network such as WSN (wireless sensor network) installed at the remote site for collecting ecological data, and the use of a public wireless communication system such as GSM (Global System for Mobile Communications) for transferring all the collected ecological data to a back-end host server unit where the ecological data are compiled into webpages for posting on a website. This feature allows the research/management personnel to browse the ecological data simply by linking a network workstation via a network system such as the Internet to the website, without having to travel to the remote site and collect ecological data by human labor.

24 Claims, 5 Drawing Sheets

WIRELESS-LINKED REMOTE ECOLOGICAL ENVIRONMENT MONITORING SYSTEM

BACKGROUND OF THE INVENTION

1. Field of the Invention

This invention relates to ecological environment monitoring technology, and more particularly, to a wireless-linked remote ecological environment monitoring system which is based on a network system and a wireless communication system for monitoring the ecological environment of a remotely-located site, such as a farmland or a garden.

2. Description of Related Art

In agricultural research and management, it is an important task to monitor the ecological environment of a farmland used to cultivate crops such as fruits, rice, and vegetables. The main purpose is to collect a set of ecological data that are considered as vital factors that would significantly affect the cultivation and growth of crops on the farmland. These ecological data include, for example, number of clustered pests (such as fruit flies) per unit area, temperature, humidity, sunlight intensity, and wind speed, to name a few. Research personnel can analyze these ecological data for effective management of the farmland to achieve optimized crop production.

Traditionally, the collection of ecological data from farmlands is carried out by human labor work. For example, the number of pests per unit area is collected by firstly using a net to capture a group of pests within a certain area, and then visually counting the total number of pests being captured in the net, and finally using statistical methods to estimate the total number of pests within the entire area. All these works are carried out by human labor. For collection of climate-related ecological data (temperature, humidity, sunlight intensity, wind speed, etc.), this task is traditionally carried out by installing temperature sensors, humidity sensors, sunlight intensity sensors, wind speed sensors on the farmland; and the sensed data are visually inspected and manually recorded by the research/management personnel. The collected ecological data are then analyzed and compiled by the research personnel into written reports. These written reports are then used as references for management of the farmland to achieve optimized crop production. For example, if the number of pests per unit area is considered to be overly large, pest-killing or expelling means should be provided; if temperature/humidity is too high, conditioning means should be installed; and if the wind speed is too high, wind-shielding means should be installed.

One apparent drawback to the labor-based work for ecological data collection is that it is quite tedious, laborious, and time-consuming for the research/management personnel to carry out. Moreover, if the farmland is located at a remote site, such as a distant mountain or rural place, the research/management personnel might have to spend lots of time and cost in the travel to the farmland.

SUMMARY OF THE INVENTION

It is therefore an objective of this invention to provide a wireless-linked remote ecological environment monitoring system which allows the research/management personnel to monitor the ecological environment of a remotely located farmland or garden without requiring the research/management personnel to travel to the farmland and collect ecological data by human labor.

The wireless-linked remote ecological environment monitoring system according to the invention is based on a network system (such as Internet) and a wireless communication system (such as GSM) for performing a remote ecological environment monitoring function that can remotely collect data about the ecological environment of a remotely-located site, such as farmland or garden.

In architecture, the remote ecological environment monitoring system of the invention comprises: (A) a sensor network; (B) a front-end gateway unit; and (C) a back-end host server unit.

The wireless-linked remote ecological environment monitoring system according to the invention is characterized by the use of a WSN system installed at the remote site for collecting ecological data, and the use of a public wireless communication system such as GSM for transferring all the collected ecological data to a back-end host server unit where the ecological data are compiled into webpages for posting on a website. This feature allows the research/management personnel to browse the ecological data simply by linking a network workstation via a network system such as the Internet to the website, without having to travel to the remote site and collect ecological data by human labor.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The wireless-linked remote ecological environment monitoring system according to the invention is disclosed in full details by way of preferred embodiments in the following with reference to the accompanying drawings.

Application of the Invention

Figure 1:
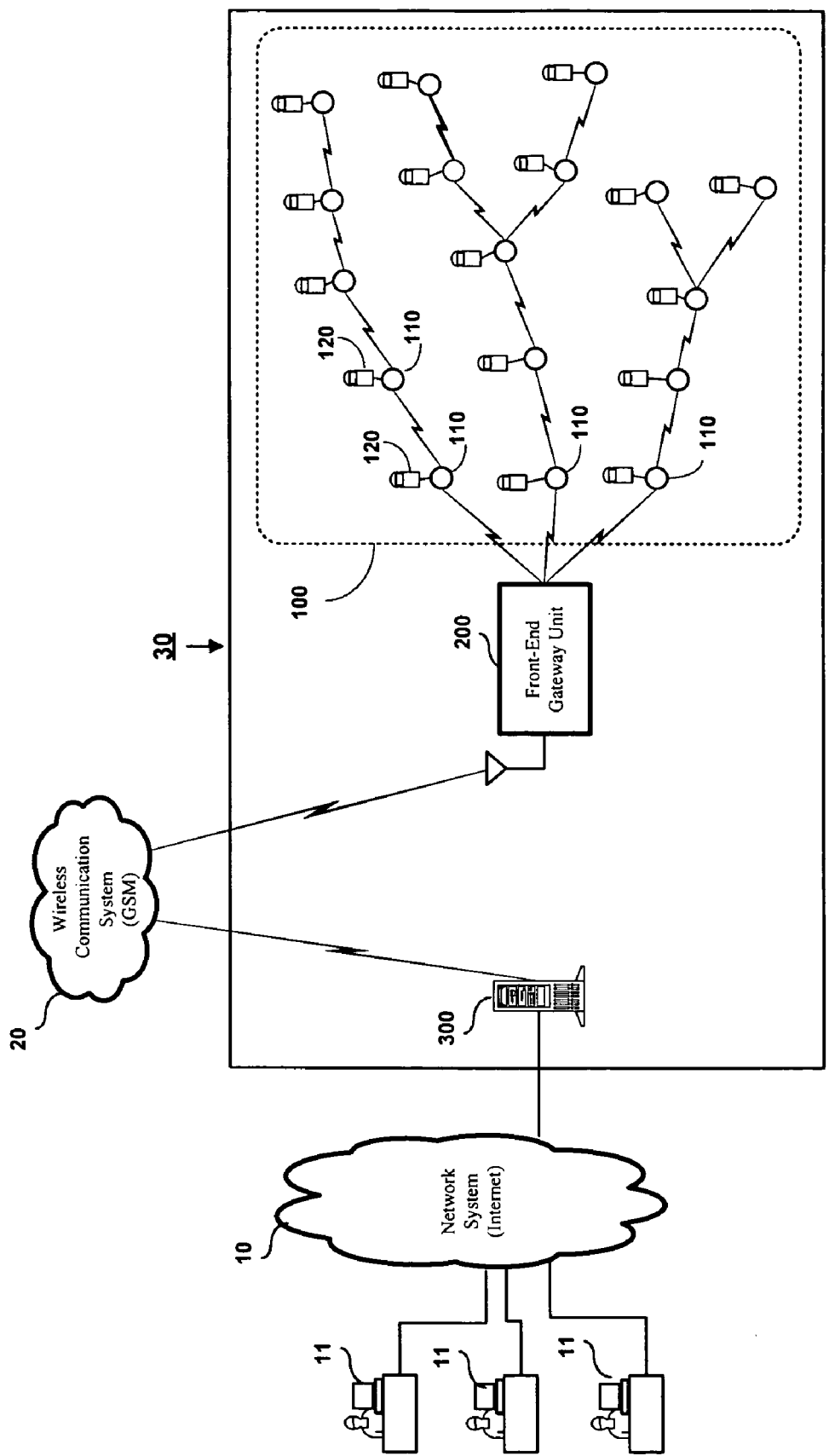
FIG. 1 is a schematic diagram showing the architecture of the remote ecological environment monitoring system of the invention.

FIG. 1 is a schematic diagram showing the application of the wireless-linked remote ecological environment monitoring system according to the invention (which is hereinafter referred to in short as "remote ecological environment monitoring system and indicated by the reference numeral 30). As shown, the remote ecological environment monitoring system of the invention 30 is designed for providing a remote ecological environment monitoring function for allowing the user (i.e., research/management personnel) at a local site to monitor the ecological environment of a remotely-located site, such as a farmland or a garden and collect ecological data such as temperature, humidity, sunlight intensity, wind speed, and number of clustered pests (such as fruit flies). In construction, the remote ecological environment monitoring system of the invention 30 is used in conjunction and based on a network system 10 and a wireless communication system 20.

In practice, for example, the network system 10 can be implemented with the Internet, an intranet, an extranet, or a LAN (Local Area Network) system, which allows a network workstation 11 to be linked to the remote ecological environment monitoring system of the invention 30, so that the user of the network workstation 11 (i.e., research/management personnel) can use a browser program to browse the ecological data that have been collected by the remote ecological environment monitoring system of the invention 30 from the remote site.

The wireless communication system 20 can be implemented with, for example, the GSM (Global System for Mobile Communications) system or other type of wireless communication system. Since the remote ecological environment monitoring system of the invention 30 is based on a distributed architecture which includes a front-end installation and a back-end installation, it is an important aspect of the invention that a wireless communication system such as the GSM system 20 is utilized for wireless connection between the front-end installation and the back-end installation.

Function of the Invention

Figure 2:
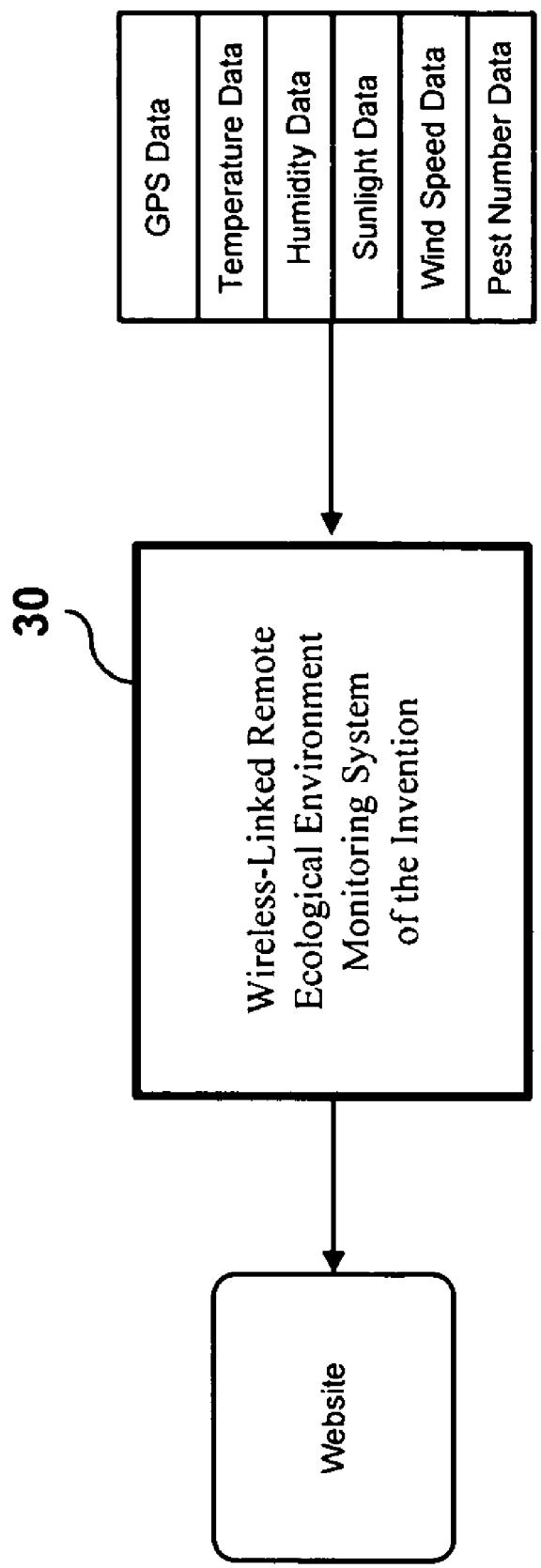
FIG. 2 is a schematic diagram showing the functional model of the remote ecological environment monitoring system of the invention.

FIG. 2 shows the functional model of the remote ecological environment monitoring system of the invention 30. As shown, the remote ecological environment monitoring system of the invention 30 is used for gathering a collection of ecological data from the remote site, which include, but not limited to, GPS (Global Positioning System) data, temperature data, humidity data, sunlight data, wind speed data, and pest number data, and is further used for compiling all the collected ecological data into a set of webpages for posting on a website to allow the research/management personnel to use the network workstation 11 to browse the ecological data through the network system 10 (such as Internet).

Architecture of the Invention

As shown in FIG. 3, in architecture, the remote ecological environment monitoring system of the invention 30 comprises: (A) a sensor network 100; (B) a front-end gateway unit 200; and (C) a back-end host server unit 300. Firstly, the respective attributes and functions of these constituent system components of the invention are described in details in the following.

Sensor Network 100

The sensor network 100 can be implemented with a cable-linked or a wireless-linked type of sensor network, and preferably implemented with a WSN (Wireless Sensor Network) system. In the following preferred embodiment, it will be assumed that the sensor network 100 is implemented with a WSN system. In this case, the WSN system 100 is composed of a clustered array of sensor nodes 110, such as a microprocessor-based sensor device under control of the TinyOS operating system (which is a well-known operating system for WSN node devices). All the sensor nodes 110 of the WSN system 100 are wireless linked to each other by using a standard wireless communication protocol, such as Zigbee or Bluetooth.

In operation, each sensor node 110 is capable of sensing the surrounding ecological environment for gather a set of ecological data such as GPS data, temperature data, humidity data, sunlight data, and wind speed data (note that these sensing functions can also be alternatively by built-in sensing functions in the front-end gateway unit 200), and can be further externally coupled with a pest-counting device 120 capable of counting the number of a cluster of pests, such as fruit flies, by luring them into a trapping container and sensing the number of pests that have entered into the trapping container.

The above-mentioned pest-counting device 120 is preferably implemented with a multi-checkpoint type clustered animal counting device, whose architecture is disclosed in the applicant's another patent application entitled "MULTI-CHECKPOINT TYPE CLUSTERED ANIMAL COUNTING DEVICE". This patent-pending multi-checkpoint type clustered animal counting device is capable of counting the number of a clustered group of pests (such as fruit flies) by luring them to enter into a trapping room and using at two checkpoints for triggering a counter. However, various other types of pest-counting devices are usable.

Figure 3A:
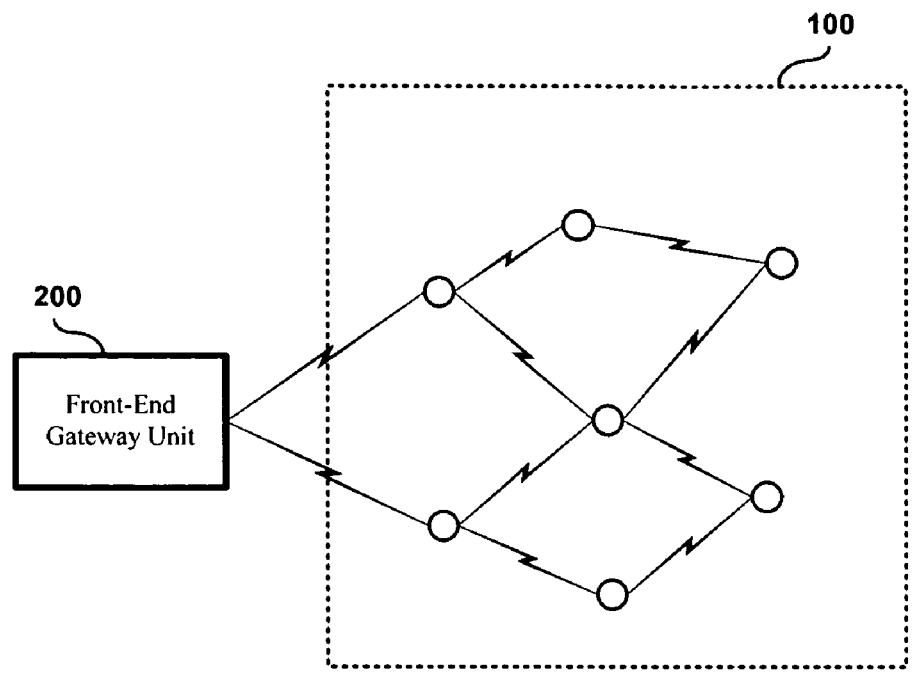
FIG. 3A is a schematic diagram showing a ring topology used by the remote ecological environment monitoring system of the invention for configuration of a WSN system.
Figure 3B:
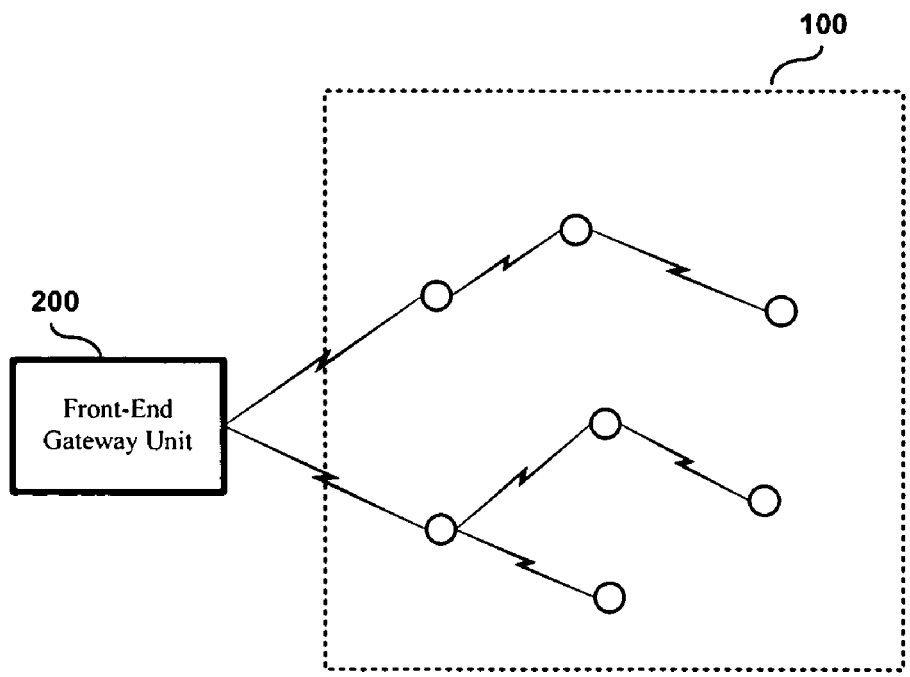
FIG. 3B is a schematic diagram showing a tree topology used by the remote ecological environment monitoring system of the invention for configuration of a WSN system.

In practice, the WSN system 100 is configured based on a predetermined topology for linking together all the sensor nodes 110 that allows the sensor nodes 110 to transmit data in a multihop routing method to the front-end gateway unit 200. In practice, the topology used for configuring the WSN system 100 can be a ring topology as shown in FIG. 3A, or a tree topology as shown in FIG. 3B. In terms of data transmission efficiency, the tree topology shown in FIG. 3B is more preferable for use than the ring topology.

Front-End Gateway Unit 200

The front-end gateway unit 200 is capable of providing a front-end gateway function for the WSN system 100 to transmit the collected ecological data in a specific transmission data format to the GSM system 20 for forwarding to a pre-specified subscriber's wireless communication mail address assigned to the back-end host server unit 300; and also capable of receiving a set of management control commands issued by the back-end host server unit 300 via the GSM system 20 and forwarding these commands to the WSN system 100 for management control of the sensor nodes 110.

Moreover, this front-end gateway unit 200 is preferably equipped with a GPS (Global Positioning System) function for detecting the geographical location where the remotely-monitored area is located. This GPS function can generate a set of geographical location data in electronic form for indicating the longitude and altitude of the location where the remotely-monitored area (farmland or garden) is located.

In addition, the front-end gateway unit 200 can be equipped with a set built-in sensing functions for sensing, for example, the temperature, humidity, sunlight, and wind speed conditions of the surrounding ecological environment. In the case that the research/management personnel wants to collect widespread ecological data from multiple locations in a wide area, the sensor nodes 110 of the WSN system 100 can be activated for sensing these ecological data. On the other hand, in the case that these ecological data can be collected from just one location in the monitored area, then these built-in sensing functions can be enabled to collect a single set of ecological data about temperature, humidity, sunlight, and wind speed that generically represent the ecological conditions of the monitored area.

In practice, for data communication with the back-end host server unit 300 via the GSM system 20, the transmission data format utilized by the front-end gateway unit 200 can be, for example, the standard SMS (Short Message Service) or GPRS (General Packet Radio Service) data format.

In operation, the front-end gateway unit 200 will first perform a configuration operation on the sensor nodes 110 of the WSN system 100 based on a predetermined topology for linking together all the sensor nodes 110 in a wireless manner that allows each sensor node 110 to exchange data with the front-end gateway unit 200 by a multihop routing method. The WSN topology is preferably a tree topology shown in FIG. 3B for providing high data transmission efficiency. In practice, for example, the data communication between the front-end gateway unit 200 and each sensor node 110 of the WSN system 100 is based on the standard S-MAC (Sensor Media Access Control) data communication protocol.

Moreover, during initialization, the front-end gateway unit 200 is capable of performing a clock synchronization operation on the WSN system 100 for clock synchronization of all the sensor nodes 110, so that all the ecological data collected by different sensor nodes 110 at the same time can be tagged with the same time data. In practice, for example, the clock synchronization operation performed by the front-end gateway unit 200 can be based on an RBS (Reference Broadcast Synchronization) method or a TPSN (Timing-sync Protocol for Sensor Networks) method. Since both the RBS and TPSN methods are conventional technology, detailed description thereof will not be given in this specification.

Figure 4A:
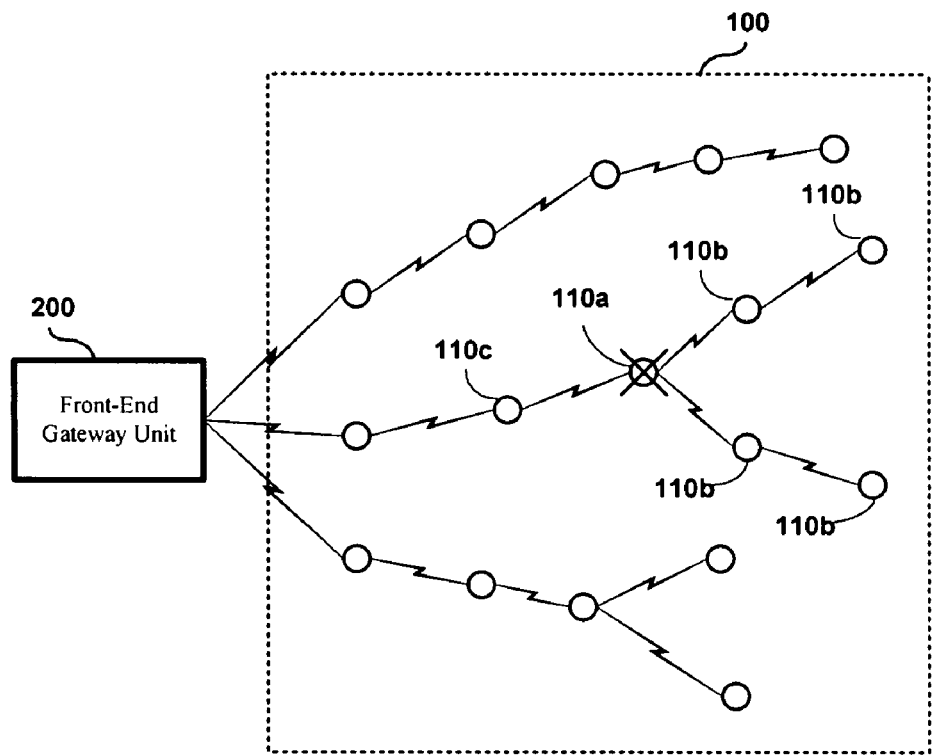
FIG. 4A is a schematic diagram used to depict the condition of a failure of a certain sensor node in the WSN system.
Figure 4B:
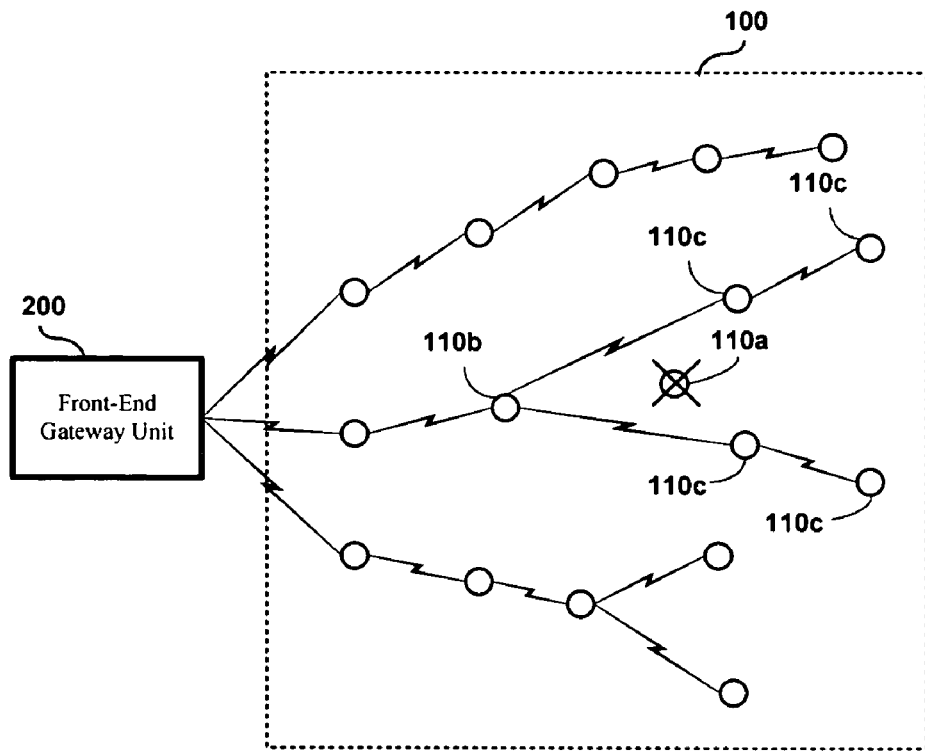
FIG. 4B is a schematic diagram showing the same of FIG. 4A after a failed link auto-redirecting operation has been performed to the WSN system.

In addition, as illustrated in FIGS. 4A-4B, the front-end gateway unit 200 is further equipped with a failed-link auto-redirecting function that can respond to a node-failure event in the WSN system 100, i.e., a sensor node 110a fails such that all the other sensor nodes 110b that are linked to the failed sensor nodes 110a are isolated from the front-end gateway unit 200, by relinking all these isolated sensor nodes 110b to a good sensor node 110c, so that these sensor nodes 110b can notwithstanding communicate with the front-end gateway unit 200 via the newly-linked good sensor node 110c.

In practical implementation, the front-end gateway unit 200 can be realized in various different manners, such as by using a personal computer (PC) unit or a programmable embedded microprocessor system. The advantage of using a PC unit for realization is that it has better system expandability for incorporating additional functions; whereas the advantage of using a programmable embedded microprocessor system is that it can operate with less electrical power consumption.

Back-End Host Server Unit 300

The back-end host server unit 300 is linked to the GSM system 20 as a subscriber to the GSM's mail service for receiving and processing the ecological data forwarded by the front-end gateway unit 200 in GSM-compliant data format via the GSM system 20. The received ecological data are stored in a relational database, such as MySQL. In operation, this back-end host server unit 300 includes a website hosting function and a remote management control function.

Figure 5:
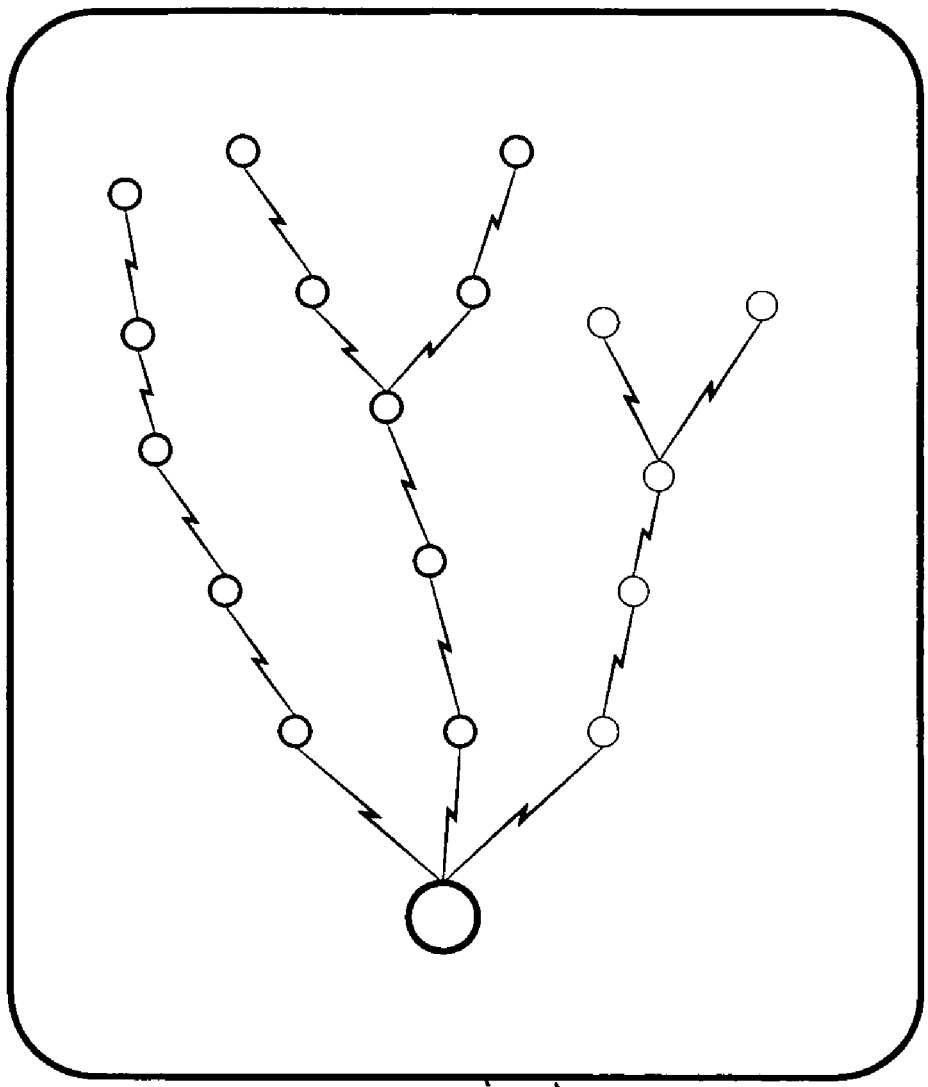
FIG. 5 is a schematic diagram showing an example of a webpage produced by the remote ecological environment monitoring system of the invention and displayed on a network workstation for user browsing.

The website hosting function is capable of hosting a website with a set of dynamic webpages that are created based on the ecological data received via the GSM system 20 from the front-end gateway unit 200 and stored in the MySQL database, so as to allow the research/management personnel to browse the collected ecological data simply by linking his/her network workstation 11 via the network system 10 to the website, as depicted in FIG. 5. In practice, for example, the ecological data (which include GPS data, temperature data, humidity data, sunlight data, wind speed data, and pest number data) can be presented in the webpages in various styles, such as tables, diagrams, and graphs. Moreover, the monitored area can be presented in a digitized map or satellite photo to show the locations of all the sensor nodes 110 of the WSN system 100, with each sensor node 110 being linked to its collected ecological data. In practice, the LabView program is used for building a user-machine interface for the webpages, but any other programs of similar functionality are usable. The ecological data can be shown individually (i.e., specific to each sensor node 110) or collectively (i.e., specific to the entire monitored area). Moreover, the ecological data can be shown on a daily basis or a periodical basis (i.e., weekly, monthly, quarterly, and yearly). Furthermore, the webpages can further include an interactive database query and search function that allows the user to search for specific ecological data from the MySQL database, such as the ecological data collected at a specific location or during a specific time period.

The remote management control function is capable of performing a set of remote management control operations on the remotely-situated WSN system 100 and front-end gateway unit 200. These remote management control operations can be user-initiated or host-initiated. When activated, the back-end host server unit 300 will issue and transmit a set of management control commands via the GSM system 20 to the front-end gateway unit 200 and the WSN system 100. In practice, the management control operations include, for example, power on/off control, clock synchronization, and sensor node initialization. In addition, the remote management control function further includes an optimized routing path computation capability that can be used to determine an optimized routing path based on the topology of the WSN system 100 for the purpose of allowing each sensor node 110 of the WSN system 100 to transmit data to the front-end gateway unit 200 along an optimized routing path (i.e., the shortest possible path). The resulted control parameters for the optimized routing path are then transmitted via the GSM system 20 and forwarded by the front-end gateway unit 200 to each sensor node 110 of the WSN system 100.

Operation of the Invention

The following is a detailed description of a practical application example of the remote ecological environment monitoring system of the invention 30 in actual operation. In this application example, it is assumed that the invention is utilized for remote monitoring of a farmland for collecting a set of ecological data about the surrounding ecological environment of the farmland, including temperature, humidity, sunlight intensity, wind speed, and number of clustered pests (such as fruit flies).

During actual operation, each sensor node 110 of the WSN system 100 will sense its surrounding environment for acquiring a set of ecological data (i.e., temperature, humidity, sunlight intensity, wind speed, and number of clustered pests), and then transfer these data in a multihop manner to the front-end gateway unit 200 for forwarding in SMS or GPRS format via the GSM system 20 to the back-end host server unit 300.

At the local site, the back-end host server unit 300 receives the uploaded ecological data in SMS/GPRS format, and then retrieves the original ecological data from the SMS/GPRS data stream. The retrieved ecological data (i.e., OPS data, temperature data, humidity data, sunlight data, wind speed data, and pest number data) are then stored into a relational database such as MySQL database.

The ecological data stored in the MYSQL database will be periodically (such as daily or weekly) processed by the back-end host server unit 300 to create a set of webpages that present the ecological data (GPS data, temperature data, humidity data, sunlight data, wind speed data, and pest number data) in various styles, such as tables, diagrams, and graphs. Moreover, the monitored area can be presented in a digitized map or satellite photo to show the locations of all the sensor nodes 110 of the WSN system 100, with each sensor node 110 being linked to its collected ecological data. These webpages are then posted by the back-end host server unit 300 on a website, so that the research/management personnel can use a network workstation 11 for linking via the network system 10 to the website to browse the ecological data shown in these webpages (as depicted in FIG. 5). Moreover, these webpages also provide an interactive database query and search function that allows the user to search for specific ecological data from the MySQL database in the back-end host server unit 300, such as the ecological data collected at a specific location or during a specific time period In conclusion, the invention provides a wireless-linked remote ecological environment monitoring system which is characterized by the use of a WSN system installed at the remote site for collecting ecological data, and the use of a public wireless communication system such as OSM for transferring all the collected ecological data to a back-end host server unit where the ecological data are compiled into webpages for posting on a website. This feature allows the research/management personnel to browse the ecological data simply by linking a network workstation via a network system such as the Internet to the website, without having to travel to the remote site and collect ecological data by human labor. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A wireless-linked remote ecological environment monitoring system which is based on a network system and a wireless communication system for remote monitoring of the surrounding ecological environment of a remote site, and which comprises:
   a sensor network, which includes a cluster of sensor nodes installed at multiple locations in the remote site, and wherein each sensor node is capable of producing a set of ecological data about the ecological conditions of the surrounding environment where the sensor network is installed;
   a front-end gateway unit, which is capable of providing a front-end gateway function for the sensor network to transmit the collected ecological data in a specific transmission data format to the wireless communication system for wireless forwarding to a prespecified subscriber's wireless communication mail address; and
   a back-end host server unit, which is linked to the prespecified subscriber's wireless communication mail address for receiving the ecological data forwarded by the front-end gateway unit via the wireless communication system, and further capable of storing the received ecological data into a database and compiling the ecological data into a set of webpages for posting on a website that allows a network workstation to gain access to the website for user-browsing of the ecological data,
   wherein the ecological data forwarded by the front-end gateway unit to the back-end host server unit include Global Positioning System (GPS) data, temperature data, humidity data, sunlight data, wind speed data, and pest number data.

2. The wireless-linked remote ecological environment monitoring system of claim 1, wherein the network system is Internet.

3. The wireless-linked remote ecological environment monitoring system of claim 1, wherein the network system is an intranet system.

4. The wireless-linked remote ecological environment monitoring system of claim 1, wherein the network system is an extranet system.

5. The wireless-linked remote ecological environment monitoring system of claim 1, wherein the network system is a LAN (Local Area Network) system.

6. The wireless-linked remote ecological environment monitoring system of claim 1, wherein the wireless communication system is GSM (Global System for Mobile Communications).

7. The wireless-linked remote ecological environment monitoring system of claim 1, wherein the sensor network is a WSN (Wireless Sensor Network) system.

8. The wireless-linked remote ecological environment monitoring system of claim 7, wherein the WSN system utilizes the Zigbee wireless communication protocol for wireless linking of the sensor nodes.

9. The wireless-linked remote ecological environment monitoring system of claim 7, wherein the WSN system utilizes the Bluetooth wireless communication protocol for wireless linking of the sensor nodes.

10. The wireless-linked remote ecological environment monitoring system of claim 7, wherein the front-end gateway unit utilizes the S-MAC (Sensor Media Access Control) protocol for data communication with each sensor node of the WSN system.

11. The wireless-linked remote ecological environment monitoring system of claim 1, wherein the sensor network is configured in a tree topology.

12. The wireless-linked remote ecological environment monitoring system of claim 1, wherein the data transmission format used by the front-end gateway unit for wireless data communication with the back-end host server unit is SMS (Short Message Service).

13. The wireless-linked remote ecological environment monitoring system of claim 1, wherein the data transmission format used by the front-end gateway unit for wireless data communication with the back-end host server unit is GPRS (General Packet Radio Service).

14. The wireless-linked remote ecological environment monitoring system of claim 1, wherein the database in the back-end host server unit is MySQL.

15. The wireless-linked remote ecological environment monitoring system of claim 1, wherein the front-end gateway unit includes a clock synchronization function for clock synchronization of all the sensor nodes in the sensor network.

16. The wireless-linked remote ecological environment monitoring system of claim 15, wherein the clock synchronization function is implemented with an RBS (Reference Broadcast Synchronization) method.

17. The wireless-linked remote ecological environment monitoring system of claim 15, wherein the clock synchronization function is implemented with a TPSN (Timing-sync Protocol for Sensor Networks) method.

18. A wireless-linked remote ecological environment monitoring system which is based on a network system and a GSM (Global System for Mobile Communications) system for remote monitoring of the surrounding ecological environment of a remote site, and which comprises:
   a wireless sensor network (WSN) system, which includes a cluster of sensor nodes installed at multiple locations in the remote site, and wherein each sensor node is capable of producing a set of ecological data about the ecological conditions of the surrounding environment where the WSN system is installed;

a front-end gateway unit, which is capable of providing a front-end gateway function for the WSN system to transmit the collected ecological data in a specific transmission data format to the GSM system for wireless forwarding to a prespecified subscriber's wireless communication mail address; and a back-end host server unit, which is linked to the prespecified subscriber's wireless communication mail address for receiving the ecological data forwarded by the front-end gateway unit via the GSM system, and further capable of storing the received ecological data into a database and compiling the ecological data into a set of webpages for posting on a website that allows a network workstation to gain access to the website for user-browsing of the ecological data, wherein the ecological data forwarded by the front-end gateway unit to the back-end host server unit include Global Positioning System (GPS) data, temperature data, humidity data, sunlight data, wind speed data, and pest number data.

19. The wireless-linked remote ecological environment monitoring system of claim 18, wherein the network system is Internet, an intranet system, an extranet system, or a LAN (Local Area Network) system.

20. The wireless-linked remote ecological environment monitoring system of claim 18, wherein the WSN system utilizes the Zigbee wireless communication protocol for wireless linking of the sensor nodes.

21. The wireless-linked remote ecological environment monitoring system of claim 18, wherein the WSN system utilizes the Bluetooth wireless communication protocol for wireless linking of the sensor nodes.

22. The wireless-linked remote ecological environment monitoring system of claim 18, wherein the front-end gateway unit utilizes the S-MAC (Sensor Media Access Control) protocol for data communication with each sensor node of the WSN system.

23. The wireless-linked remote ecological environment monitoring system of claim 18, wherein the WSN system is configured in a tree topology.

24. The wireless-linked remote ecological environment monitoring system of claim 18, wherein the data transmission format used by the front-end gateway unit for wireless data communication with the back-end host server unit is SMS (Short Message Service).

* * * * *